United States Patent [19]
Shimizu

[11] Patent Number: 5,442,502
[45] Date of Patent: Aug. 15, 1995

[54] DISK DRIVE APPARATUS THAT POSITIONS A DISC CASSETTE WITHOUT A SLIDE PLATE

[75] Inventor: Hirohiko Shimizu, Tokyo, Japan
[73] Assignee: Sony Corporation, Tokyo, Japan
[21] Appl. No.: 834,410
[22] Filed: Feb. 12, 1992
[30] Foreign Application Priority Data
   Feb. 14, 1991 [JP] Japan .................. 3-040789
[51] Int. Cl.⁶ .................................. G11B 17/04
[52] U.S. Cl. .................... 360/99.02; 360/99.06
[58] Field of Search ........ 360/96.5, 96.6, 99.01–99.03, 360/99.06, 99.07, 99.02, 99.03, 99.06, 99.07; 369/75.1, 75.2, 77.1, 77.2, 191, 201, 202, 219, 256, 263

[56] References Cited

U.S. PATENT DOCUMENTS

| | | | |
|---|---|---|---|
| 4,337,533 | 6/1982 | Ando et al. ................ | 360/86 |
| 4,498,161 | 2/1985 | Eisemann ..................... | 360/99.06 |
| 4,583,140 | 4/1986 | Shimaoka et al. ............ | 360/99.06 |
| 4,680,654 | 7/1987 | Shibuya ......................... | 360/96.5 |
| 4,750,065 | 6/1988 | Masaki et al. ............... | 360/105 |
| 4,777,550 | 10/1988 | Taguchi et al. ............. | 360/99.02 |
| 4,864,440 | 9/1989 | Satoh et al. .................. | 360/99.02 |
| 4,878,139 | 10/1989 | Hasegawa et al. ........... | 360/99.02 |
| 4,918,553 | 4/1990 | Suzuki et al. ................ | 360/99.06 |
| 5,006,944 | 4/1991 | Miyasaka ...................... | 360/99.02 |
| 5,025,339 | 6/1991 | Kanno et al. ................. | 360/99.02 |
| 5,060,101 | 10/1991 | Isomura ........................ | 360/99.06 |
| 5,123,004 | 6/1992 | Arai ............................... | 360/99.02 |
| 5,144,508 | 9/1992 | Noda et al. ................... | 360/99.02 |
| 5,153,792 | 10/1992 | Kawano ........................ | 360/99.02 |

FOREIGN PATENT DOCUMENTS

| | | | |
|---|---|---|---|
| 0130636 | 1/1985 | European Pat. Off. ......... | 360/99.06 |
| 58-102361 | 6/1983 | Japan .............................. | 360/99.06 |
| 60-106065 | 6/1985 | Japan .............................. | 360/99.06 |
| 1-155551 | 6/1989 | Japan .............................. | 360/99.06 |

*Primary Examiner*—Robert S. Tupper
*Assistant Examiner*—Jefferson Evans
*Attorney, Agent, or Firm*—Limbach & Limbach

[57] ABSTRACT

A disk drive apparatus has a cassette holder into which a disk cassette is inserted. The cassette holder is obliquely reciprocated between a cassette insert position and a cassette load position as guided by a plurality of inclined guides provided on a pair of side plates of a chassis. In ejecting the disk cassette, the cassette holder is moved directly by an eject lever against a biasing member. Accordingly, it is unnecessary to employ a slide plate for reciprocating the cassette holder.

2 Claims, 9 Drawing Sheets

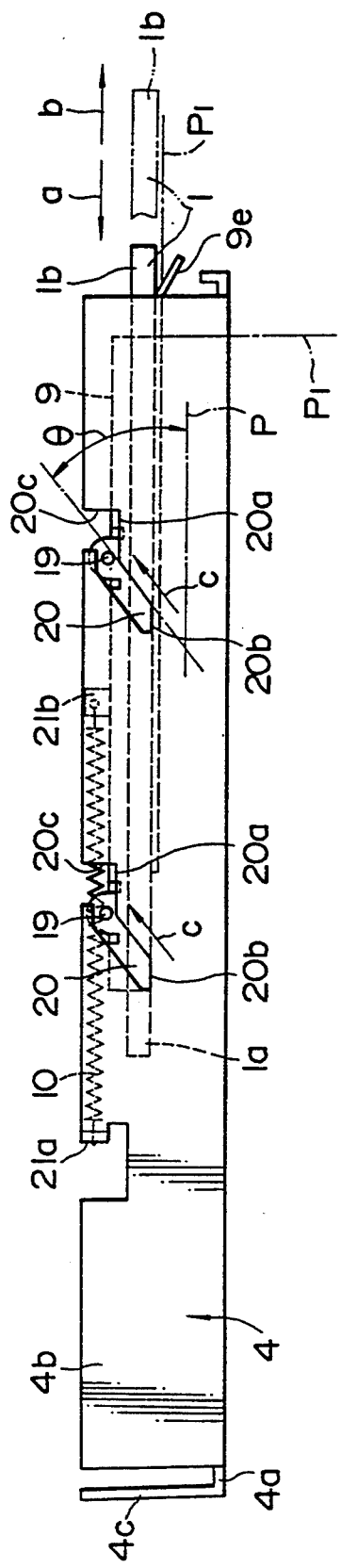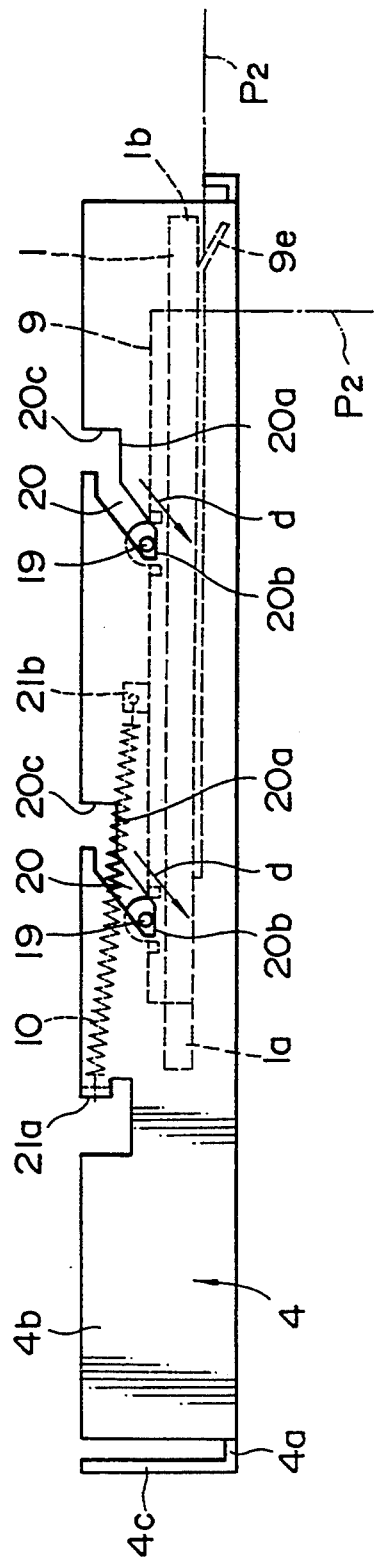

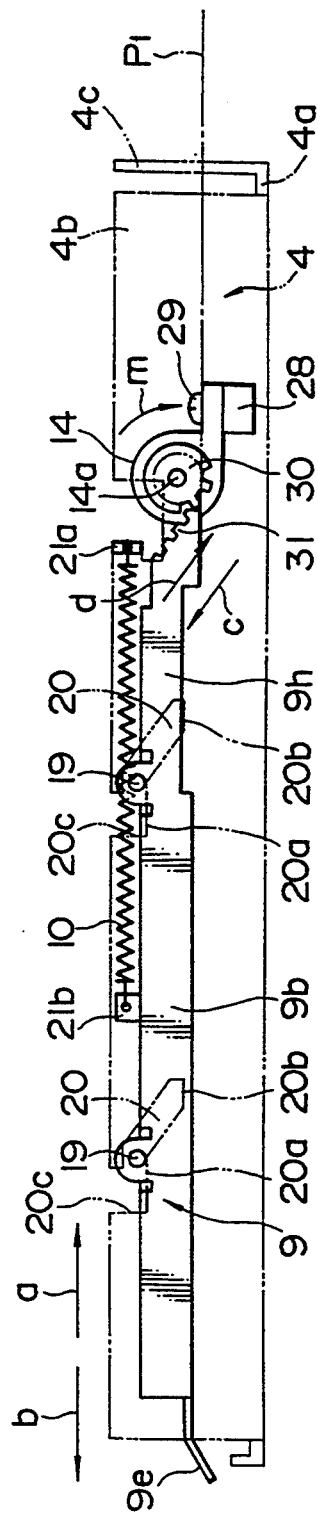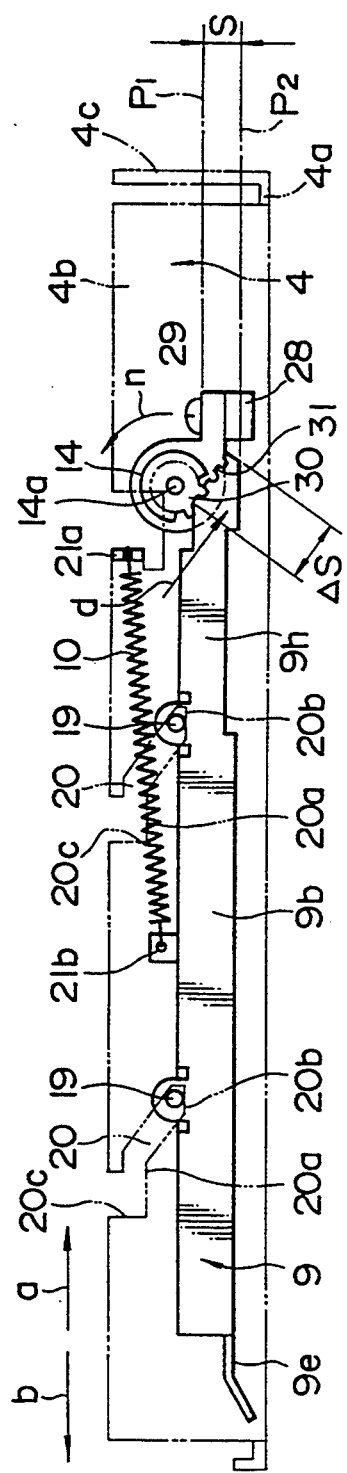

DISK DRIVE APPARATUS THAT POSITIONS A DISC CASSETTE WITHOUT A SLIDE PLATE

BACKGROUND OF THE INVENTION

The present invention relates to a disk device such as a floppy disk device, and more particularly to a disk device having a cassette holder adapted to be reciprocated.

Examples of a floppy disk device are described in U.S. Pat. No. 4,750,065 and U.S. Pat. application Ser. No. 641,778. filed Jan. 16, 1991, now abandoned.

In such a conventional floppy disk device, a slide plate having a substantially U-shaped cross section is mounted inside a chassis having a substantially U-shaped cross section in such a manner that a bottom plate and a pair of side plates of the slide plate overlap a bottom plate and a pair of side plates of the chassis, respectively. A pair of side plates of a cassette holder are provided with first four guided portions, and the pair of side plates of the slide plate are provided with four inclined guides as inclined grooves. The first four guided portions of the cassette holder are engaged with the four inclined guides of the slide plate, respectively. The pair of side plates of the cassette holder are further provided with second two guided portions, and the pair of side plates of the slide plate are further provided with two vertical guides as vertical grooves. The second two guided portions of the cassette holder are engaged with the two vertical guides of the slide plate, respectively. The slide plate is biased return spring as biasing means in a direction counter to a cassette insert direction. A trigger lever is provided to lock the slide plate in a cassette insert position. An eject button as an eject operating portion is provided at one end of the slide plate on the side of insertion of a disk cassette. A spindle motor for driving the disk cassette is mounted on the bottom plate of the chassis.

In loading the disk cassette into the floppy disk device, the disk cassette is horizontally inserted into the cassette holder locked in the cassette insert position, and the locked condition of the slide plate by the trigger lever is released by the disk cassette inserted.

As a result, the slide plate is slid by the return spring in the direction counter to the cassette insert direction. Accordingly, the first four guided portions of the cassette holder are guided to be urged downwardly by the four inclined guides of the slide plate, and the second two guided portions of the cassette holder are guided by the two vertical guides of the slide plate. In this way, the cassette holder is vertically lowered to a cassette load position, and the disk cassette in the cassette holder is horizontally mounted to a spindle of the spindle motor located in the cassette load position.

In general, such a floppy disk device is provided with a damper for decelerating a moving (lowering) speed of the cassette holder to damp a shock of movement of the cassette holder by the return spring. Accordingly, the cassette holder is moved forth slowly and safely from the cassette insert position to the cassette load position.

In ejecting the disk cassette from the floppy disk device, the eject button is depressed by an operator's finger to slide the slide plate in the cassette insert direction against the return spring. As a result, the cassette holder is vertically raised to be returned to the cassette insert position in the reverse manner, and the slide plate is locked again by the trigger lever. After the cassette holder is returned to the cassette insert position, the disk cassette is automatically ejected from the cassette insert opening of the front panel.

However, the conventional floppy disk device has the following problems.

Firstly, as mentioned above, the slide plate having a substantially U-shaped cross section is slidably mounted inside the chassis having a substantially U-shaped cross section, and the cassette holder is vertically reciprocated by sliding the slide plate. Accordingly, as a first problem, the number of parts and the weight of the floppy disk device are increased, and the assembling of the floppy disk device is troublesome to increase a cost. Furthermore, the thickness of the slide plate causes an increase in thickness and width of the floppy disk device as a whole.

Secondly, the spindle motor is mounted on the bottom plate of the chassis, and a motor substrate for mounting thereon drive circuit parts for the spindle motor is mounted under the bottom plate. Accordingly, as a second problem, the thickness of the floppy disk device as a whole is increased.

Thirdly, since a vertical displacement of the cassette holder from the cassette insert position to the cassette load position is small, the slide plate adapted to be horizontally moved with a stroke larger than the vertical displacement of the cassette holder is employed to rotationally drive the damper. Accordingly, as a third problem, the slide plate is an essential part as a rotational driving part for the damper.

Fourthly, since the eject button is provided at one end of the slide plate on the side of insertion of the disk cassette, the eject button projects frontwardly from a position under the cassette insert opening of the front panel. Accordingly, as a fourth problem, when the eject button is depressed by an operator's finger to eject the disk cassette, there is a possibility that the cassette insert opening of the front panel is partially closed by the operator's finger. This possibility causes that the disk cassette to be ejected from the cassette insert opening of the front panel with a slight time lag after the depression of the eject button by the finger is apt to interfere with the finger, which may incur the displeasure of the operator.

SUMMARY OF THE INVENTION

It is a first object of the present invention to provide a disk device which can eliminate the slide plate to thereby solve the first problem.

It is a second object of the present invention to provide a disk device which can reduce the thickness thereof as a whole to thereby solve the second problem.

It is a third object of the present invention to provide a disk device which can eliminate the slide plate and rotationally drive the damper with a sufficient stroke to thereby solve the third problem.

It is a fourth object of the present invention to provide a disk device which can eliminate the interference of the disk cassette to be ejected from the cassette insert opening with the operator's finger when the operator depresses the eject operating portion to thereby solve the fourth problem.

According to a first aspect of the present invention achieving the first object, there is provided a disk device comprising a plurality of guided portions provided on a pair of side plates of said cassette holder; a plurality of inclined guides provided in a pair of side plates of a chassis, for obliquely guiding said guided portions between said cassette insert position and said cassette load position; biasing means for biasing said cassette holder to move the same from said cassette insert position to said cassette load position; and an eject lever connected to said cassette holder for directly moving said cassette holder obliquely from said cassette load position to said cassette insert position against said biasing means.

With this arrangement, the cassette holder is obliquely reciprocated between the cassette insert position and the cassette load position as being guided by the plurality of inclined guides provided on the pair of side plates of the chassis. In ejecting the disk cassette, the cassette holder is moved directly by the eject lever against the biasing means. Accordingly, the slide plate necessary in the prior art can be eliminated.

According to a second aspect of the present invention achieving the second object, there is provided a disk device comprising lower and upper step portions formed by upwardly double drawing a bottom plate of the chassis and a motor substrate fixed to said bottom plate for mounting thereon a spindle motor and drive circuit parts for said spindle motor, an outer peripheral portion of said motor substrate being fitted with said lower step portion of said bottom plate from the under side thereof and fixed to said lower step portion by means of screws said upper step portion serving to cover an upper side of said drive circuit parts, said spindle motor being located in an opening formed through said upper step portion.

With this arrangement, the spindle motor and the drive circuit parts for the spindle motor are mounted on the upper surface of the motor substrate. The bottom plate of the chassis is integrally formed with the lower and upper step portions upwardly double drawn. The motor substrate is fitted with the lower step portion from the under side thereof and is fixed to the lower step portion by means of screws. Accordingly, the motor substrate can be made substantially flush with the bottom plate.

According to a third aspect of the present invention achieving the third object, there is provided a disk device comprising a plurality of guided portions provided on a pair of side plates of said cassette holder; a plurality of inclined guides provided in a pair of side plates of a chassis, for obliquely guiding said guided portions between said cassette insert position and said cassette load position; biasing means for biasing said cassette holder to move the same from said cassette insert position to said cassette load position; a trigger lever for locking said cassette holder in said cassette insert position, wherein a locked condition of said cassette holder by said trigger lever is released by insertion of said disk cassette into said cassette holder; an inclined rack formed on said cassette holder so as to be inclined in parallel to said inclined guides; and a damper mounted on said chassis and adapted to be rotationally driven by said inclined rack.

With this arrangement, the cassette holder adapted to be moved forth obliquely from the cassette insert position to the cassette load position is provided with the inclined rack, and the damper is rotationally driven by the inclined rack. Accordingly, the slide plate necessary in the prior art can be eliminated. Furthermore, the damper can be rotationally driven with a sufficient stroke by the inclined rack.

According to a fourth aspect of the present invention achieving the fourth object, there is provided a disk device comprising an eject operating portion for returning the cassette holder from the cassette load position to the cassette insert position, said eject operating portion being located outside a front panel having a cassette insert opening.

With this arrangement, the eject operating portion is located outside the front panel. Accordingly, when the eject operating portion is operated by an operator's finger to eject the disk cassette, there is no possibility that the cassette insert opening of the front panel is partially closed by the operator's finger.

Other objects and features of the invention will be more fully understood from the following detailed description and appended claims when taken with the accompanying drawings.

BRIEF DESCRIPTION OF THE DRAWINGS

FIG. 1A is a side view taken along the line A—A in FIG. 6, showing a chassis and a cassette holder of a floppy disk device according to a preferred embodiment of the present invention under the condition where the cassette holder is in a cassette insert position;

FIG. 1B is a view similar to FIG. 1A under the con where the cassette holder is in a cassette load position;

FIG. 3A is a side view taken along the line B—B in FIG. 6, showing an inclined rack and a damper in the floppy disk device under the condition where the cassette holder is in the cassette insert position;

FIG. 3B is a view similar to FIG. 3A under the condition where the cassette holder is in the cassette load position;

DETAILED DESCRIPTION OF THE PREFERRED EMBODIMENT

There will now be described a preferred embodiment of the present invention applied to a floppy disk device.

First, the floppy disk device will be generally described. As shown in FIGS. 1A and 1B, a cassette holder 9 can be reciprocated in the inclined directions, that is, in the directions of arrows c and d along inclined guides 20 of a chassis 4 between a cassette insert position P1 and a cassette load position P2 without using a slide plate.

Figure 2:
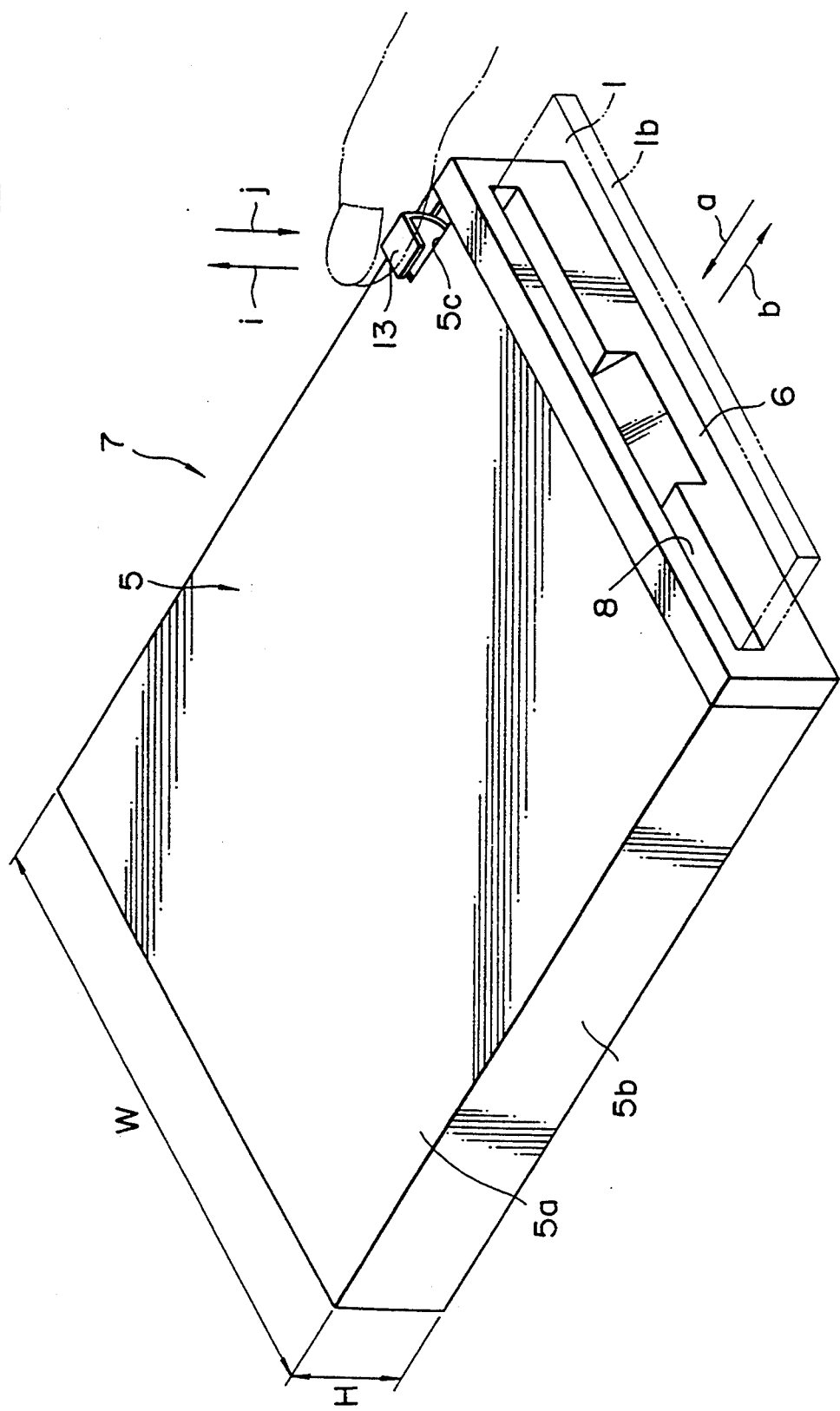
FIG. 2 is a perspective view showing an appearance of the floppy disk device as a whole.

As shown in FIG. 2, an eject operating portion 13 for effecting an eject operation of the cassette holder 9 is located outside a front panel 6 so as to be movable in the vertical directions, that is, in the directions of arrows i and j.

As shown in FIGS. 3A and 3B, a damper 14 is rotationally driven by an inclined rack 31 integrally formed with the cassette holder 9.

Figure 4:
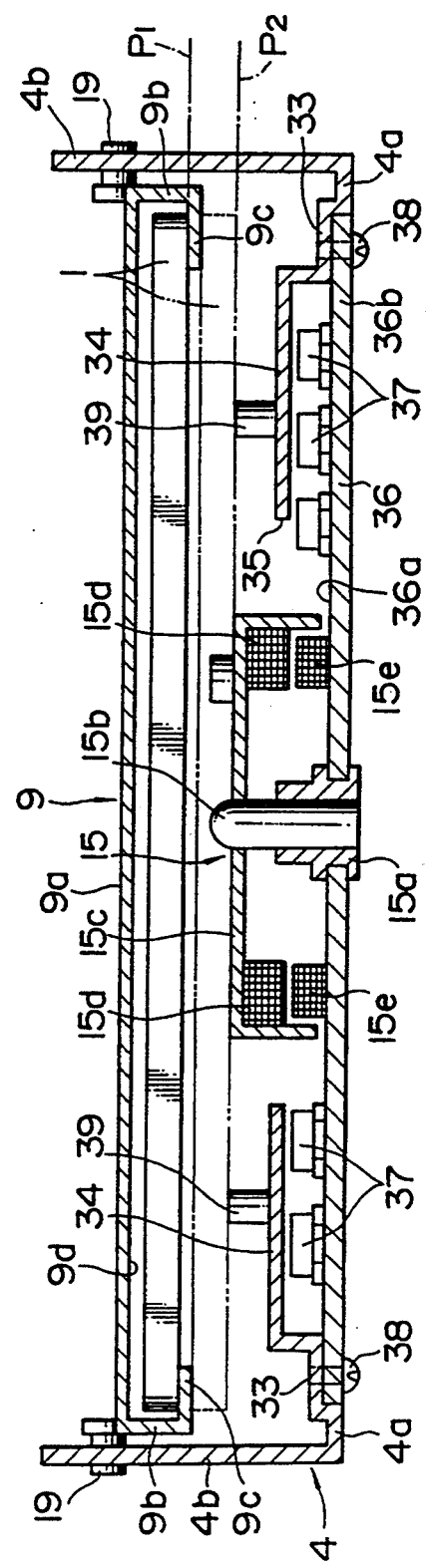
FIG. 4 is a sectional view taken along the line C—C in FIG. 6, showing a cross section of the chassis.

As shown in FIG. 4, a bottom plate 4a of the chassis 4 is integrally formed with a lower step portion 33 and an upper step portion 34. The step portions 33 and 34 are formed by upwardly double drawing the bottom plate 4a of the chassis 4.

Now, the construction of the floppy disk device will be individually described in more detail.

Figure 5:
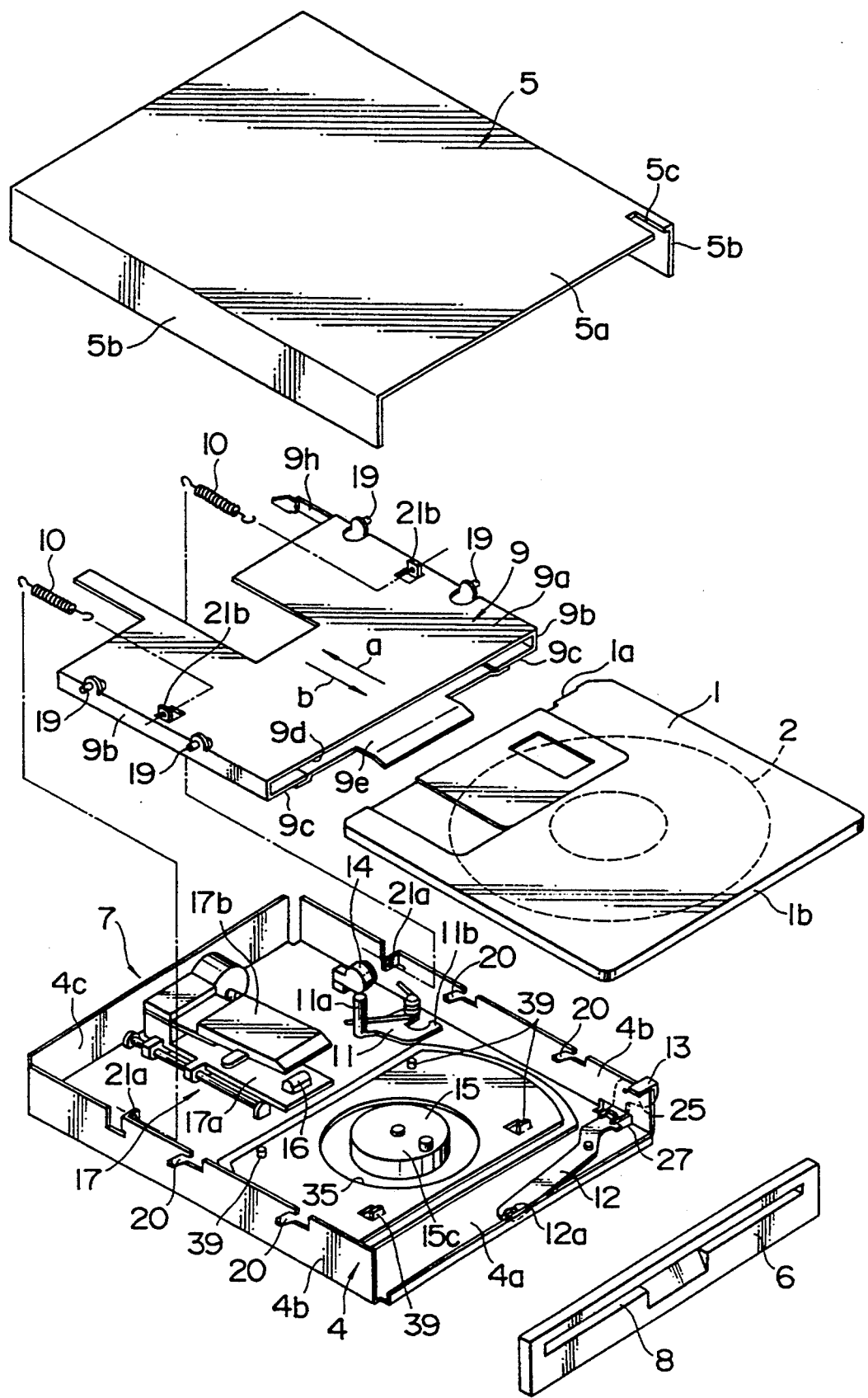
FIG. 5 is an exploded perspective view of the floppy disk device as a whole.

Referring to FIG. 5, reference numeral 1 designates a disk cassette (which will be hereinafter referred simply to as a cassette). A floppy disk 2 as a recording/reproducing disk is rotatably accommodated in the cassette 1.

Figure 6:
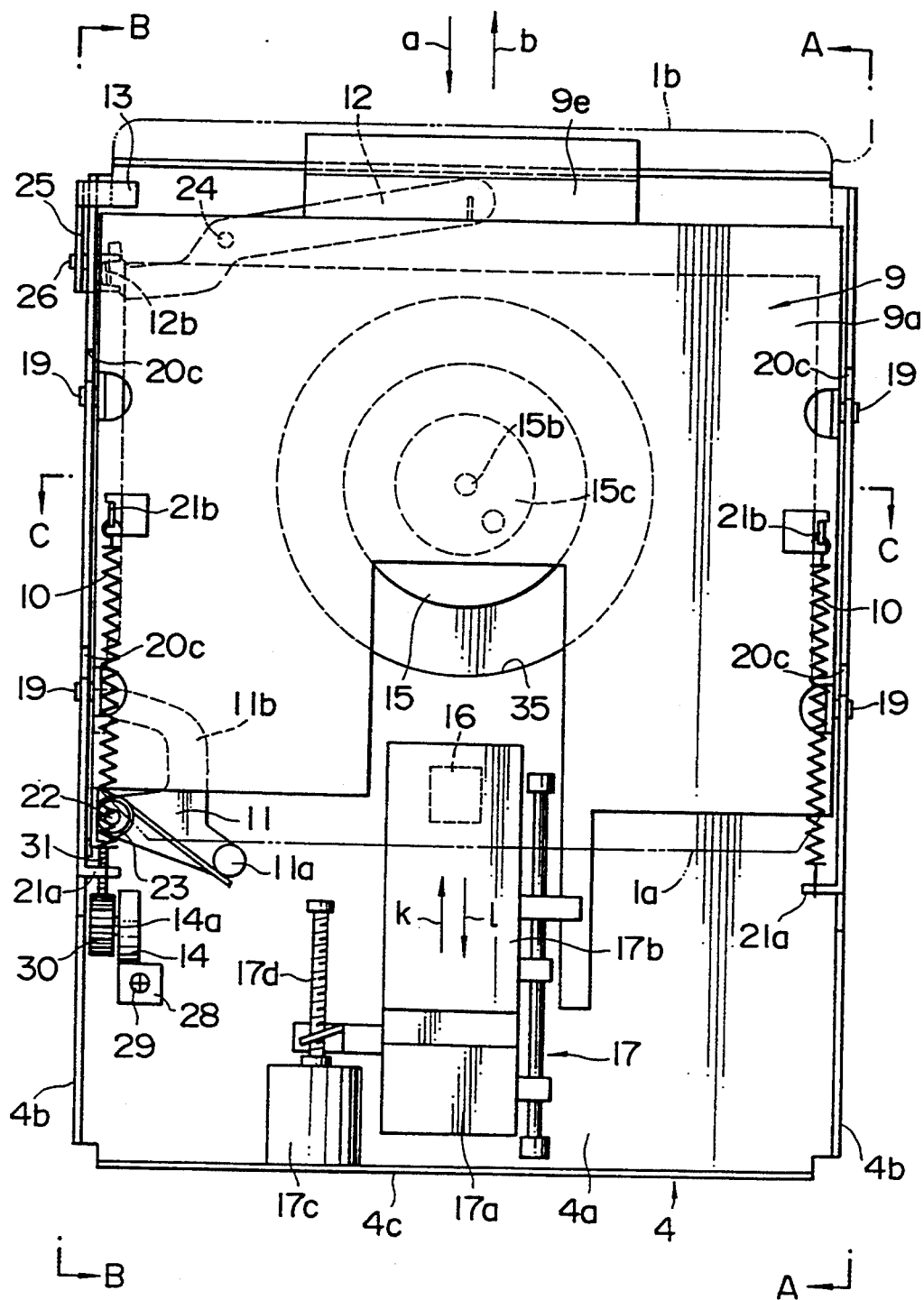
FIG. 6 is a plan view showing the cassette holder and the chassis of the floppy disk device.

As shown in FIGS. 5 and 6, the floppy disk device constitutes a case 7 having a flat shape of rectangular parallelepiped as shown in FIG. 2. The case 7 comprises a chassis 4, a cover 5 covering an upper side of the chassis 4, and a front panel 6 vertically mounted to a front side of the chassis 4 and the cover 5. The front panel 6 is provided with a horizontally extending cassette insert opening 8. The case 7 incorporates therein a cassette holder 9, a pair of tension springs 10 as biasing means, a trigger lever 11, an eject lever 12, an eject operating portion 13, a damper 14, a spindle motor 15, and a head moving device 17 for moving a pair of upper and lower magnetic heads 16.

As shown in FIG. 5, the chassis 4 is formed by pressing a sheet metal, and it has a U-shaped cross section comprising a horizontal bottom plate 4a and a pair of side plates 4b upwardly vertically bent from right and left ends of the bottom plate 4a. Further, a rear plate 4c is upwardly vertically bent from a rear end of the bottom plate 4a.

As shown in FIG. 5, the cover 5 is formed by pressing a sheet metal, and it has an inverted U-shaped cross section comprising a horizontal top plate 5a and a pair of side plates 5b downwardly vertically bent from right and left ends of the top plate 5a. As shown in FIG. 2, the cover 5 is engaged with the chassis 4 from the upper side thereof and is fixed thereto by screws (not shown) in such a manner that the upper opening of the chassis 4 and the outer surfaces of the opposite side plates 4b are covered with the top plate 5a and the opposite side plates 5b, respectively.

As shown in FIG. 5, the front panel 6 is formed by molding a synthetic resin, and the cassette insert opening 8 is horizontally formed along a central portion of the front panel 6. As shown in FIG. 2, the front panel 6 is perpendicularly engaged with the front ends of the chassis 4 and the cover 5 and is fixed thereto by screws (not shown). Thus, the front panel 6 is combined with the chassis 4 and the cover 5 to constitute the case 7.

As shown in FIG. 5, the cassette holder 9 is formed by pressing a sheet metal, and it is generally constituted of a horizontal top plate 9a, a pair of side plates 9b downwardly vertically bent from right and left ends of the top plate 9a, and a pair of bottom plates 9c inwardly horizontally bent from lower ends of the side plates 9b, thereby defining a flat horizontal cassette insert space 9d as shown in FIG. 4. Further, front end portions (on the side directed by an arrow b) of the bottom plates 9c are horizontally connected with each other by a cassette insert guide plate 9e.

As shown in FIG. 5, each side plate 9b of the cassette holder 9 is provided with two guided portions 19 as horizontal pins projecting horizontally outwardly at front and rear positions (in respect of the directions of arrows a and b). That is, four guided portions 19 are totally provided on the opposite side plates 9b of the cassette holder 9. On the other hand, each side plate 4b of the chassis 4 is provided with two inclined guides 20 as inclined grooves extending in parallel to each other at the front and rear positions. That is, four inclined guides 20 are totally formed in the opposite side plates 4b of the chassis 4. As shown in FIG. 1A, the inclined guides 20 of each side plate 4b are inclined in parallel to each other at a predetermined angle $\theta$ with respect to a horizontal reference line P as shown in FIG. 1A so as to extend obliquely downwardly as advancing in a cassette insert direction, that is, in the direction of arrow a. An upper end 20a and a lower end 20b of each inclined guide 20 are formed as horizontal step portions, and the upper end 20a is communicated at its upper portion with a recess 20c opening to the upper side of each side plate 4b.

As shown in FIGS. 1A, 1B and 6, the four guided portions 19 of the cassette holder 9 are inserted from the recesses 20c into the four inclined guides 20 of the chassis 4, and are slidably engaged with the four inclined guides 20, so that the cassette holder 9 is assembled with the chassis 4 so as to be horizontally spanned between the opposite side plates 4b of the chassis 4. The cassette holder 9 can be reciprocated in a parallel motion in the inclined directions, that is, in the directions of arrows c and d along the inclined guides 20 between a cassette insert position P1 or an upper position where the cassette holder 9 is horizontally maintained by the engagement of the guided portions 19 with the upper ends 20a of the inclined guides 20 as shown in FIG. 1A and a cassette load position P2 or a lower position where the cassette holder 9 is horizontally maintained by the engagement of the guided portions 19 with the lower ends 20b of the inclined guides 20 as shown in FIG. 1B.

As shown in FIGS. 1A, 1B, 5 and 6, the opposite side plates 4b of the chassis 4 are formed with two spring hook portions 21a, and the top plate 9a of the cassette holder 9 is formed at its opposite side positions with two spring hook portions 21b. The right and left tension springs 10 constituting the biasing means are stretched between the right pair of the spring hook portions 21a and 21b and the left pair of the spring hook portions 21a and 21b, respectively. The cassette holder 9 is normally biased by the two tension springs 10 so as to be moved in the direction of arrow d.

As shown in FIGS. 5, 6, 7A and 7B, the trigger lever 11 is formed by molding a synthetic resin, and it is located behind the cassette holder 9 (on the side directed by the arrow a) near one of the side plates 4b of the chassis 4 so as to be rotatable in the horizontal directions, that is, in the directions of arrows e and f about a fulcrum pin 22 vertically projecting from the bottom plate 4a of the chassis 4. The trigger lever 11 is integrally formed with a vertical cassette abutting pin 11a and a horizontal lock arm 11b. A torsion spring 23 is loosely engaged with an outer circumference of the fulcrum pin 22, and opposite ends 23a and 23b of the torsion spring 23 abut against the cassette abutting pin 11a and one of the side plates 4b of the chassis 4, respectively. Accordingly, the trigger lever 11 is normally biased by the torsion spring 23 to be rotated in the direction of arrow e. A locked portion 9f is so formed as to be bent downwardly vertically from one of the bottom plates 9c of the cassette holder 9. The locked portion 9f of the cassette holder 9 is adapted to be locked by the lock arm 11b of the trigger lever 11.

As shown in FIGS. 5, 6, 8 and 9, the eject lever 12 is provided on the bottom plate 4a of the chassis 4 at a front end portion thereof (on the side directed by the arrow b) so as to be rotatable in the horizontal directions, that is, in the directions of arrows g and h about a fulcrum pin 24. A connecting portion 9g is so formed as to project downwardly vertically from a lower surface of the cassette insert guide plate 9e of the cassette holder 9. The connecting portion 9g of the cassette holder 9 is engaged with a connecting hole formed at one end of the eject lever 12.

As shown in FIGS. 2, 5, 6, 8 and 9, an eject operating lever 25 is provided outside one of the side plates 4b of the chassis 4 at a front end portion thereof (on the side directed by the arrow b) so as to be rotatable in the vertical directions, that is, in the directions of arrows i and j about a fulcrum pin 26. The eject operating lever 25 is bent horizontally at its upper end to form the eject operating portion 13. A lower end 25a of the eject operating lever 25 is also bent horizontally and is inserted from a cutout 27 of the side plate 4b into the chassis 4. The eject lever 12 is bent at the other end thereof to form a connecting portion projecting vertically upwardly. The connecting portion 12b of the eject lever 12 is engaged with a connecting hole 25b formed at the lower end 25a of the eject operating lever 25. As shown in FIG. 2, the upper end portion of the eject operating lever 25 is exposed upwardly from a cutout 5c formed through the top plate 5a of the cover 5, so that the eject operating portion is located outside the front panel 6 so as to be movable in the vertical directions, that is, in the directions of arrows i and j.

As shown in FIGS. 3A, 3B, 5 and 6, the damper 14 is provided behind the trigger lever 11 (on the side directed by the arrow a) so as to be fixedly mounted on a base 28 on the bottom plate 4a of the chassis 4 by means of a set screw 29. The damper 14 is constructed as a rotary damper with oil sealed, for example. A pinion 30 is integrally mounted on one end of a rotating shaft 14a of the damper 14. A plate-like extension arm 9h extends integrally from a rear end (on the side directed by the arrow a) of one of the side plates 9b of the cassette holder 9 in the rearward direction, that is, in the direction of arrow a. The extension arm 9h of the cassette holder 9 is formed at its rear end with an inclined rack 31 inclined in parallel to the inclined guides 20. The inclined rack 31 meshes with the pinion 30.

As shown in FIGS. 4 and 5, the bottom plate 4a of the chassis 4 under the cassette holder 9 is integrally formed with a lower step portion 33 and an upper step portion 34. The step portions 33 and 34 are formed by upwardly double drawing the bottom plate 4a of the chassis 4. The upper step portion 34 is provided with a central opening 35. A spindle motor 15 is mounted on an upper surface 36a of a motor substrate 36 at a substantially central portion thereof. A plurality of drive circuit parts 37 constituting a drive circuit for the spindle motor 15 are mounted on the upper surface 36a of the motor substrate 36 around the spindle motor 15. The motor substrate 36 is constructed as a so-called COC substrate comprising a metal substrate and a wiring pattern layer formed on the metal substrate through an insulator layer. The spindle motor 15 comprises a bearing 15a fixed to the motor substrate 36, a spindle 15b rotatably mounted on the bearing 15, a turn table 15c as a rotor fixed to the spindle 15b, magnets 15d fixed to an inside surface of the turn table 15c, and coils 15e mounted on the upper surface 36a of the motor substrate 36, whereby the turn table 15c is rotationally driven integrally with the spindle 15b.

An outer peripheral portion 36b of the motor substrate 36 is fitted with the lower step portion 33 of the bottom plate 4a from the under side thereof, and is fixed to the lower step portion 33 from the under side thereof by means of a plurality of set screws 38. In this fixed condition, the motor substrate 36 is substantially flush with the bottom plate 4a. The upper step portion 34 serves as a cover for covering an upper side of the drive circuit parts 37. The spindle motor 15 is located so as to be exposed from the central opening 35 of the upper step portion 34 in such a manner that the spindle 15b and the turn table 15c project upwardly from the upper step portion 34. Four cassette placing members 39 are provided on an upper surface of the upper step portion 34.

As shown in FIGS. 5 and 6, a head moving device 17 is constructed like a conventional one. That is, a pair of magnetic heads 16 are mounted on opposed surfaces of a carriage 17a and an arm 17b at their front end portions (on the side directed by the arrow b). The carriage 17a is stepwise fed in the opposite directions of arrows k and l by means of a lead screw 17d of a stepping motor 17c. The arm 17b is adapted to be vertically moved together with the cassette holder 9.

The operation of the floppy disk device will now be described.

In the cassette loading operation, the cassette 1 is horizontally inserted in the direction of arrow a from the cassette insert opening 8 of the front panel 6 shown in FIG. 2 into the cassette insert space 9d of the cassette holder 9 locked in the cassette insert position P1 as shown in FIG. 1A.

Figure 7A:
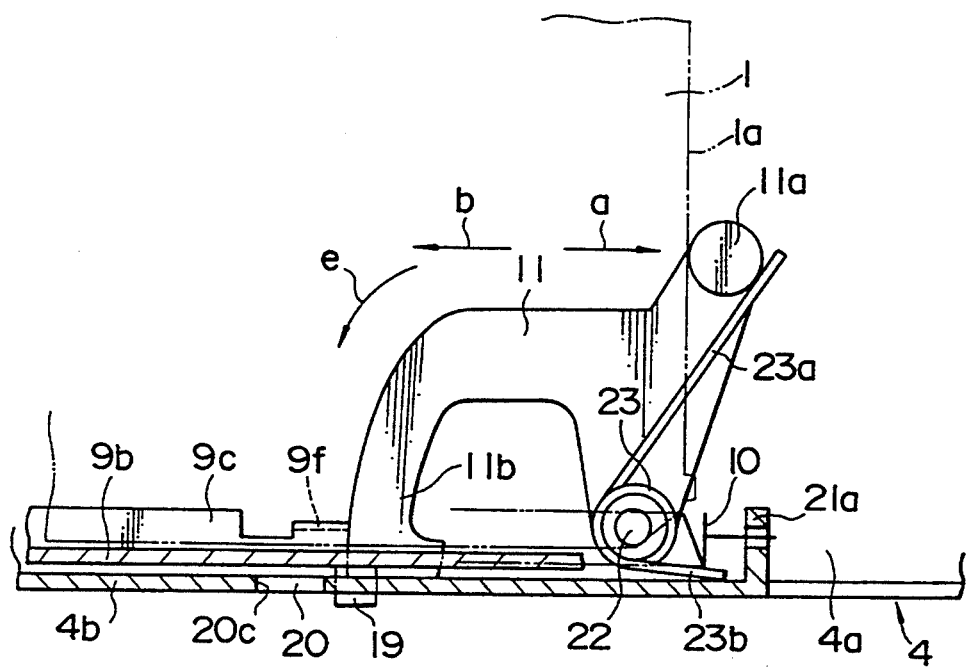
FIG. 7A is a plan view showing a trigger lever in the floppy disk device under the condition where the cassette holder is in a locked position.
Figure 7B:
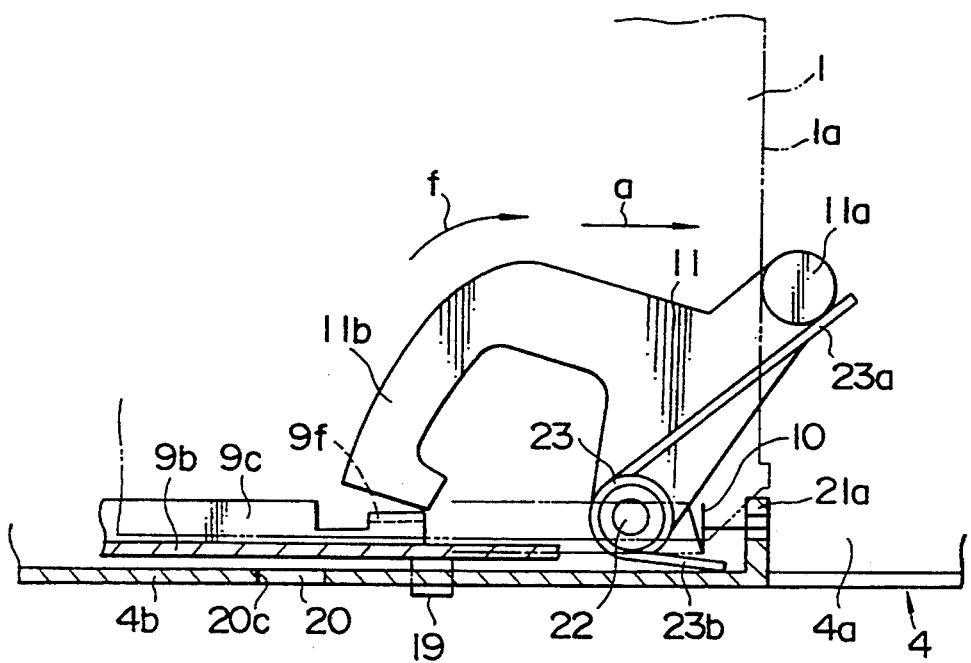
FIG. 7B is a view similar to FIG. 7A under the condition where the cassette holder is in an unlocked position.

Just before completion of the insertion of the cassette 1, a front end 1a of the cassette 1 is brought into abutment against the cassette abutting pin 11a of the trigger lever 11 and urges the cassette abutting pin 11a in the direction of arrow a as shown in FIG. 7A. As a result, as shown in FIG. 7B, the trigger lever 11 is rotated in the direction of arrow f about the fulcrum pin 22 against the torsion spring 23, and the lock arm 11b is accordingly brought into disengagement from the locked portion 9f of the cassette holder 9, thereby unlocking the cassette holder 9 in the cassette insert position P1.

In this manner, the cassette holder 9 is unlocked substantially simultaneously with completion of the insertion of the cassette 1. Accordingly, as shown in FIG. 1B, the cassette holder 9 is moved in the direction of arrow a by the two tension springs 10. At this time, the four guided portions 19 of the cassette holder 9 are obliquely downwardly guided by the respective four inclined guides 20, so that the cassette holder 9 is moved obliquely downwardly (moved forth) in a parallel motion in the direction of arrow d from the cassette insert position P1 to the cassette load position P2.

At this time, as shown in FIG. 3B, the inclined rack 31 of the cassette holder 9 is lowered in the direction of arrow d to thereby rotationally drive the pinion 30 of the damper 14 in the direction of arrow n. Accordingly, the rotating shaft 14a of the damper 14 is rotated at a low speed to generate a large rotation resistance, which decelerates a lowering speed of the cassette holder 9. Thus, the cassette holder 9 is lowered (moved forth) slowly and safely from the cassette insert position P1 to the cassette load position P2.

In the lowering operation of the cassette holder 9, the inclined rack 31 operates to rotationally drive the damper 14 with an inclined stroke $\Delta S$ which is sufficiently larger than a vertical displacement S of the cassette holder 9 from the cassette insert position P1 to the cassette load position P2. Therefore, the cassette holder 9 can be effectively decelerated with use of the small damper 14.

When the cassette holder 9 is lowered to the cassette load position P2, the cassette 1 is horizontally placed on the four cassette placing members 39 as shown by a phantom line, and the floppy disk 2 in the cassette 1 is chucked to the spindle 15b and the turn table 15c. At the same time, the pair of upper and lower magnetic heads 16 are brought into contact with upper and lower surfaces of the floppy disk 2. In this way, a series of cassette loading operation is completed.

Figure 8:
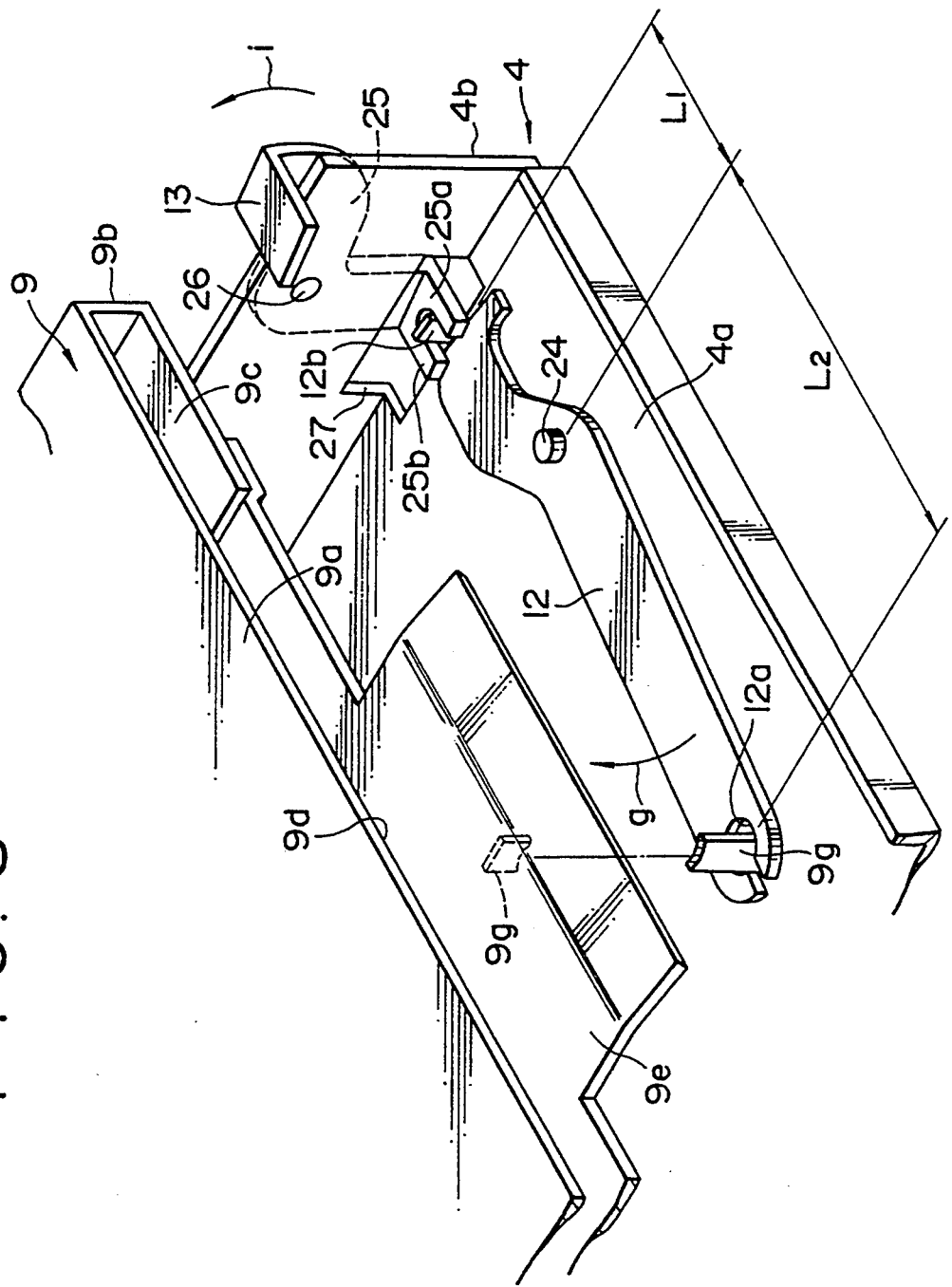
FIG. 8 is a perspective view showing an eject lever and an eject operating portion in the floppy disk device in a cassette loading operation.

Further, when the cassette holder 9 is lowered to the cassette load position P2, the eject lever 12 is rotated in the direction of arrow g, and the eject operating lever 25 and the eject operating portion 13 are accordingly moved upwardly in the direction of arrow i as shown in FIG. 8.

Figure 9:
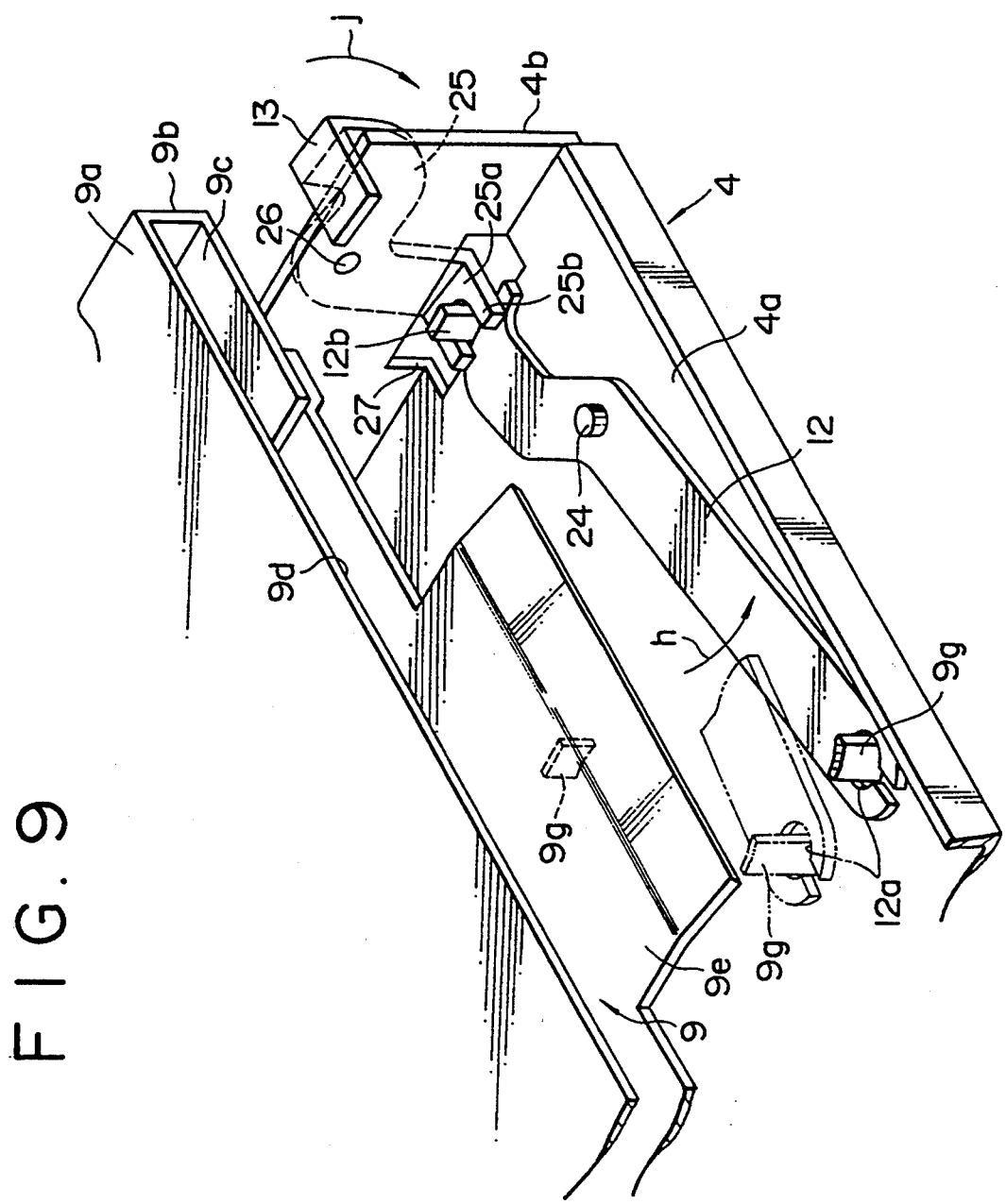
FIG. 9 is a view similar to FIG. 8, showing a cassette ejecting operation.

Conversely, in the cassette ejecting operation, the eject operating portion 13 is depressed downwardly in the direction of arrow j by a finger, thereby rotating the eject lever 12 through the eject operating lever 25 in the direction of arrow h as shown in FIGS. 2 and 9.

As a result, the cassette holder 9 is directly moved in the direction of arrow b through the connecting portion 9g and the cassette insert guide plate 9e against the tension springs 10. At this time, the four guided portions 19 are obliquely upwardly guided by the respective four inclined guides 20 as shown in FIG. 1A, so that the cassette holder 9 is moved obliquely upwardly (moved back) in a parallel motion in the direction of arrow c from the cassette load position P2 to the cassette insert position P1. Further, at this time, the pair of upper and lower magnetic heads 16 are moved away from the upper and lower surfaces of the floppy disk 2 in the cassette 1.

In the rising operation of the cassette holder 9, the inclined rack 31 operates to rotationally drive the pinion 30 of the damper 14 in the direction of arrow m. However, the rotating shaft 14a of the damper 14 hardly generates a rotation resistance to the rotation in the direction of arrow m (due to a one-way decelerating function of the damper 14). Therefore, the cassette holder 9 is smoothly raised (moved back) from the cassette load position P2 to the cassette insert position P1.

At the very movement when the cassette holder 9 reaches the cassette insert position P1, the trigger lever 11 is rotated in the direction of arrow e by the torsion spring 23 as shown in FIG. 7A, and the lock arm 11b is brought into engagement with a rear end (on the side directed by the arrow a) of the locked portion 9f of the cassette holder 9, thus automatically locking the cassette holder 9 in the cassette insert position P1.

Furthermore, at this time, the cassette abutting pin 11a of the trigger lever 11 strongly pushes the front end 1a of the cassette 1 in the direction of arrow b as shown in FIG. 7A. Accordingly, immediately when the cassette holder 9 reaches the cassette insert position P1, the cassette 1 is automatically ejected out of the cassette insert space 9d of the cassette holder 9 in the direction of arrow b, and a rear end 1b of the cassette 1 (on the side directed by the arrow b) is automatically projected from the cassette insert opening 8 of the front panel 6 shown in FIG. 2 in the direction of arrow b. In this way, a series of cassette ejecting operation is completed.

The cassette 1 is ejected by downwardly depressing the eject operating portion 13 in the direction of arrow j with a finger as shown by a phantom line in FIG. 2, and the eject operating portion 13 is located outside and above the front panel 6. Accordingly, there is no problem such that the finger partially closes the cassette insert opening 8. Furthermore, when the eject operating portion 13 is downwardly depressed by the finger, there occurs no inconvenience such that the finger interferes with the rear end 1b of the cassette 1 ejected so as to be projected in the direction of arrow b out of the cassette insert opening 8 with a slight time lag.

The floppy disk device in this preferred embodiment does not employ any slide plate necessary in the prior art. That is, in the prior art, the slide plate having a substantially U-shaped cross section is mounted inside the chassis 4, so as to reciprocate the cassette holder 9 between the cassette insert position P1 and the cassette load position P2. Accordingly, in this preferred embodiment, a thickness H and a width W of the floppy disk device as a whole shown in FIG. 2 can be reduced by the amount corresponding to the thickness of the slide plate.

The floppy disk device in this preferred embodiment employs the eject lever 12 instead of the slide plate to effect the eject operation of the cassette holder 9 in the direction of arrow b as shown in FIGS. 8 and 9. Accordingly, by arbitrarily changing an arm ratio L1:L2 of the eject lever 12, an eject stroke of the cassette holder 9 and a force necessary for effecting the eject operation of the cassette holder 9 can be freely set.

Further, as shown in FIG. 4, the bottom plate 4a of the chassis 4 is integrally formed with the lower step portion 33 and the upper step portion 34, thereby making the motor substrate 36 substantially flush with the bottom plate 4a. Accordingly, the thickness H shown in FIG. 2 can be further reduced. Additionally, since a rigidity of the bottom plate 4a can be increased, the floppy disk device can be lightened by using the chassis 4 having a small thickness.

Further, the upper step portion 34 serves as a cover for covering the upper side of the drive circuit parts 37 mounted on the motor substrate 36. Accordingly, it is possible to prevent a trouble such that the drive circuit parts 37 are damaged by other members falling, colliding, or contacting from the upper side of the drive circuit parts 37.

Having thus described a specific preferred embodiment of the present invention, it is appreciated that the present invention is not limited to the preferred embodiment but various-effective modifications may be made on the basis of the scope of the present invention.

Further, although the above preferred embodiment of the present invention has been applied to a floppy disk device, it is appreciated that the present invention may be applied to various disk devices using various disk cassettes.

As described above, the disk device of the present invention exhibits the following effects.

The cassette holder is obliquely reciprocated between the cassette insert position and the cassette load position as being guided by the plurality of inclined guides provided in the pair of side plates of the chassis. Furthermore, the cassette holder is directly moved for the eject operation by the eject lever against the biasing means, thereby eliminating a slide plate necessary in the prior art. Accordingly, the number of parts is reduced to thereby lighten the disk device, and the number of assembling steps is also reduced to thereby improve a productivity and reduce a cost.

The thickness and the width of the disk device as a whole can be reduced by the amount corresponding to the thickness of the slide plate, thereby making the disk device compact.

The eject stroke of the cassette holder and the necessary force for effecting the eject operation of the cassette holder can be freely set by arbitrarily changing the arm ratio of the eject lever.

What is claimed is:

1. In a disk device having a cassette holder into which a disk cassette is inserted, said cassette holder being reciprocated between a cassette insert position and a cassette load position, the improvement comprising:

a plurality of guided portions provided on a pair of side plates of said cassette holder;

a plurality of inclined guides provided in a pair of side plates of a chassis, the plurality of inclined guides obliquely guiding said guided portions between said cassette insert position and said cassette load position and wherein each of said inclined guides comprises an inclined surface sloped downwardly from one end thereof on the side of a cassette insert opening of said cassette holder in an insert direction of said disk cassette;

biasing means for biasing said cassette holder to move from said cassette insert position to said cassette load position;

an eject lever connected to said cassette holder for directly moving said cassette holder obliquely from said cassette load position to said cassette insert position against said biasing means;

means for locking said cassette holder in said cassette insert position against said biasing means, wherein when said disk cassette is inserted into said cassette holder by a predetermined amount, a locked condition of said cassette holder by said locking means is released, and said guided portions are lowered along said inclined guides by a biasing force of said biasing means, so that said cassette holder is moved to said cassette load position;

an inclined rack formed on said cassette holder so as to be inclined in parallel to said inclined guides; and a damper mounted on said chassis and rotationally driven by said inclined rack, the damper damping a moving speed of said cassette holder moving from said cassette insert position to said cassette load position.

2. In a disk device having a cassette holder into which a disk cassette is inserted, said cassette holder being reciprocated between a cassette insert position and a cassette load position, the improvement comprising:

a plurality of guided portions provided on a pair of side plates of said cassette holder;

a plurality of inclined guides provided in a pair of side plates of a chassis, the plurality of inclined guides obliquely guiding said guided portions between said cassette insert position and said cassette load position;

biasing means for biasing said cassette holder to move from said cassette insert position to said cassette load position;

a trigger lever for locking said cassette holder in said cassette insert position, wherein a locked condition of said cassette holder by said trigger lever is released by insertion of said disk cassette into said cassette holder;

an inclined rack formed on said cassette holder so as to be inclined in parallel to said inclined guides; and a damper mounted on said chassis and rotationally driven by said inclined rack.

* * * * *